Dec. 21, 1965     H. E. MUELLER     3,224,192
MULTI-CHAMBERED LIQUID PROPELLANT THRUST DEVICE
Filed June 18, 1963     7 Sheets-Sheet 1

INVENTOR.
HEINZ E. MUELLER
BY

*Earl C. Hancock*

AGENT

INVENTOR.
HEINZ E. MUELLER
BY
Earl C. Hancock
AGENT

Dec. 21, 1965      H. E. MUELLER      3,224,192
MULTI-CHAMBERED LIQUID PROPELLANT THRUST DEVICE
Filed June 18, 1963      7 Sheets-Sheet 3

INVENTOR.
HEINZ E. MUELLER
BY
Earl C. Hancock
AGENT

Dec. 21, 1965  H. E. MUELLER  3,224,192
MULTI-CHAMBERED LIQUID PROPELLANT THRUST DEVICE
Filed June 18, 1963  7 Sheets-Sheet 4

INVENTOR.
HEINZ E. MUELLER
BY
Earl C. Hancock
AGENT

INVENTOR.
HEINZ E. MUELLER
BY
Earl C. Hancock
AGENT

Dec. 21, 1965     H. E. MUELLER     3,224,192
MULTI-CHAMBERED LIQUID PROPELLANT THRUST DEVICE
Filed June 18, 1963     7 Sheets-Sheet 6

INVENTOR.
HEINZ E. MUELLER
BY
Earl C. Hancock
AGENT

Dec. 21, 1965 H. E. MUELLER 3,224,192
MULTI-CHAMBERED LIQUID PROPELLANT THRUST DEVICE
Filed June 18, 1963 7 Sheets-Sheet 7

INVENTOR.
HEINZ E. MUELLER
BY
*Gary D. Fields*
ATTORNEY

United States Patent Office 3,224,192
Patented Dec. 21, 1965

3,224,192
MULTI-CHAMBERED LIQUID PROPELLANT THRUST DEVICE
Heinz E. Mueller, Littleton, Colo., assignor to The Martin-Marietta Corporation, Baltimore, Md., a corporation of Maryland
Filed June 18, 1963, Ser. No. 288,726
6 Claims. (Cl. 60—35.6)

This invention relates to devices for imparting thrust to vehicles. More particularly, the present invention relates to devices for producing thrust from the combustion of liquid fuels or propellants. Although not intended to be specifically limited thereto, the present invention is particularly useful as a liquid propellant rocket engine for use in vehicles capable of atmospherically sustained flight, space vehicles of all types and missiles.

Present and prospective activities in space demand a large variety of propulsion devices to meet a wide range of thrust requirements. At the present time, each of these requirements is being supplied by a single thrust chamber or a cluster of a small number of such thrust chambers. However, by the presently known approach, the thrust producing engine for a given requirement must be individually designed and produced in a manner that practically amounts to hand-tailoring. Even then, the engine so produced is useful only for the requirement for which it was designed. For each additional requirement, an entirely new thrust chamber design must be generated and entirely new fabrication arrangements and techniques must be utilized. Thus in the present state of the art, the advantages of mass production are substantially lost and there is no generally accepted standard which will permit relatively rapid design and production transition from one engine design to another.

Furthermore, by the state of the art thrust chamber configurations, increasing requirements for thrust capabilities can only be met by thrust chambers of increasing physical dimensions. Attempts to resolve the problem by clusters of state of the art thrust chambers leads to serious reductions in operational reliability because of such problems as the complexity of plumbing, thrust distribution, and thrust vectoring or gimballing. Accordingly the increasing length of a total rocket engine can only be temporarily minimized by clustering state of the art engines and this only at the cost of a considerable reduction in reliability. That is to say, the trade-off point between further clustering of state of the art engines and reliability is quickly reached and thereafter the engines can only continue to grow in length as thrust demand increases. The result of this trend is further complication of the equipment and problems associated with ground handling of the vehicle as well as increased manufacturing problems. In addition, the use of clustered solid propellant boosters is clearly no solution for the start-stop engine operation of a maneuvering space vehicle.

Accordingly, the present invention is a device for selectably producing thrust through the combustion of liquid propellants, is relatively simple to manufacture while being characterized by simple transition of design and production, and is radically shorter in length than known rocket engines, all of these features being realizable over a wide spectrum of thrust requirements. More specifically, the present invention is a thrust plate type of rocket engine which employs a large number of small generally cylindrical shaped thrust chambers brazed to a head plate which contains a mass of ports therethrough arranged to communicate with the combustion chamber portions of the thrust chambers. A manifold or series of manifolds cover the head plate ports so that a liquid propellant under pressure introduced thereinto will be passed into the combustion chambers. The present invention also contemplates including means for circulating a second liquid propellant around the exterior of the thrust chambers for cooling purposes and thence forcing the second liquid into the combustion chambers for burning with the first liquid. Each of the thrust chambers incorporated in the device is itself a low thrust producing apparatus but the total thrust of the combination is simply a function of the number of chambers included.

In a preferred embodiment of the present invention, ignition system problems are eliminated by employing hypergolic propellant liquids which will automatically combust upon contact with one another. In addition, the preferred embodiment includes a cover plate brazed over the nozzle exits which provides a two-fold advantage. First, the entire area between the thrust chambers can be filled with the flow of the pressurized second propellant liquid thus removing the necessity for complex plumbing connecting the liquid to orifices therefor leading into each combustion chamber. Secondly, the mechanical strength of the entire engine can be markedly increased by the honeycomb-like structure that is thus provided.

By use of the present invention, mass production techniques can be advantageously utilized with relatively liberal tolerances thereby realizing minimum production costs. Design transition from one thrust requirement to another is simplified by selecting a standard thrust chamber unit size which permits standardization upon an engine length radically shorter than any known engine heretofore for a similar function. The present invention permits use of liquid propellants with the start-stop operational advantages thereof while at the same time realizing an extremely high degree of reliability notwithstanding the simplicity of manufacture. Furthermore, the present invention provides relatively uniform thrust distribution over its plate-like configuration and can be easily modified to produce thrust magnitude and/or vector control.

The novel features considered characteristic of this invention are set forth with particularity in the appended claims. The invention, however, as to both its organization and preferred modes of operation as well as additional features and advantages thereof will be best understood from the following description when read in conjunction with the accompanying drawings in which:

Figure 1:
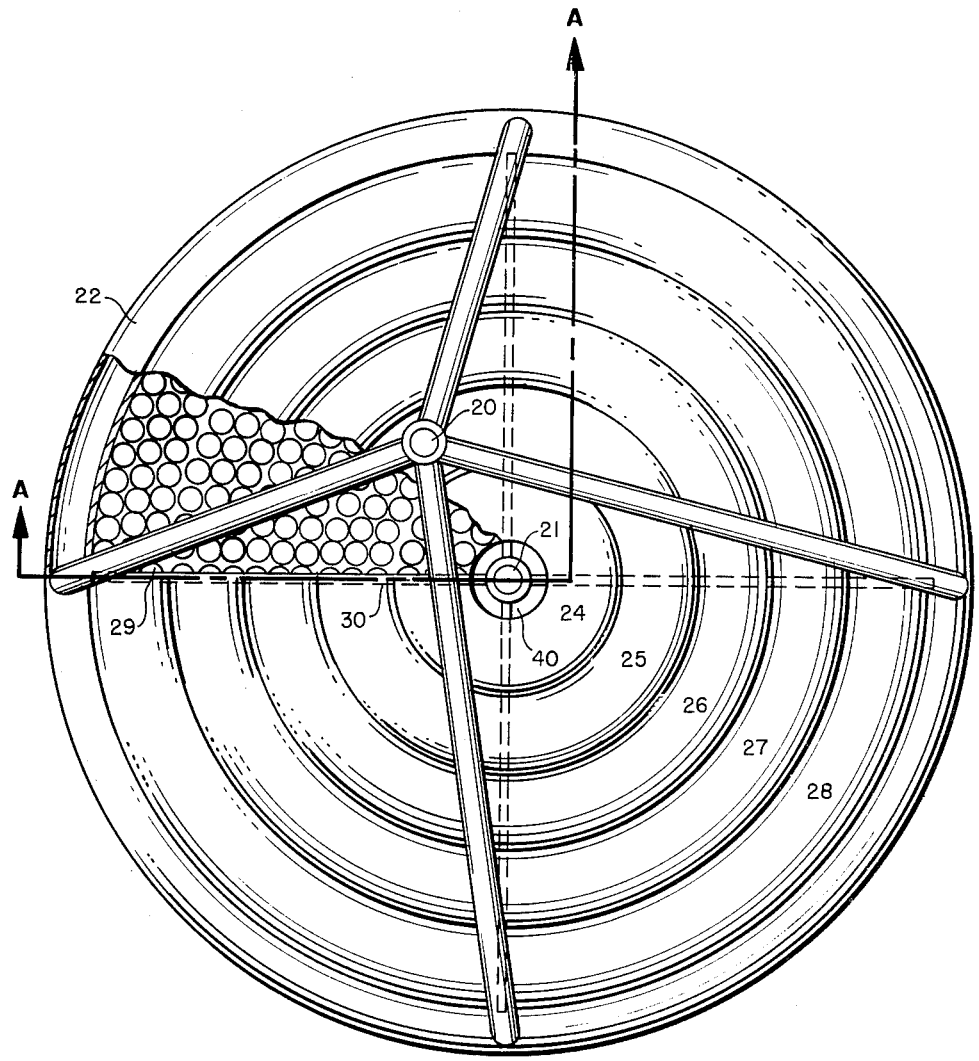
FIGURE 1 is a top view of one embodiment of the present invention with a portion of the upper manifolds broken away.

With the storage tanks and other plumbing and structure omitted for purposes of clarity, FIGURE 1 reveals a view of a thrust producing device in accordance with the present invention as might be seen from where the storage tanks would normally be located. For purposes of illustration, it will be assumed that this device is to operate using hypergolic fluids and, also by way of example, that an oxidizer fluid is introduced from a storage tank under pressure to valve 20 while pressurized fuel fluid is introduced from another storage tank to valve 21. The oxidizer is passed from valve 20 through four interconnecting pipes into concentric oxidizer manifold 22 and thence into internal piping around the thrust chambers as will be described in more detail later. It should be understood that the use of pressurized tanks as is contemplated in the preferred embodiment is to obviate the need for pumps and turbines but the present invention can be readily adapted to such devices if desired.

Five circular fuel manifolds 24 to 28 which are generally semi-circular in cross-section (which can be better appreciated from FIGURE 2) cover the top of a generally circular plate under which are mounted a plurality of elongated thrust chamber units. The tops of the thrust chamber units can be seen in the section which is broken away with a typical such unit being shown at 29.

Figure 2:
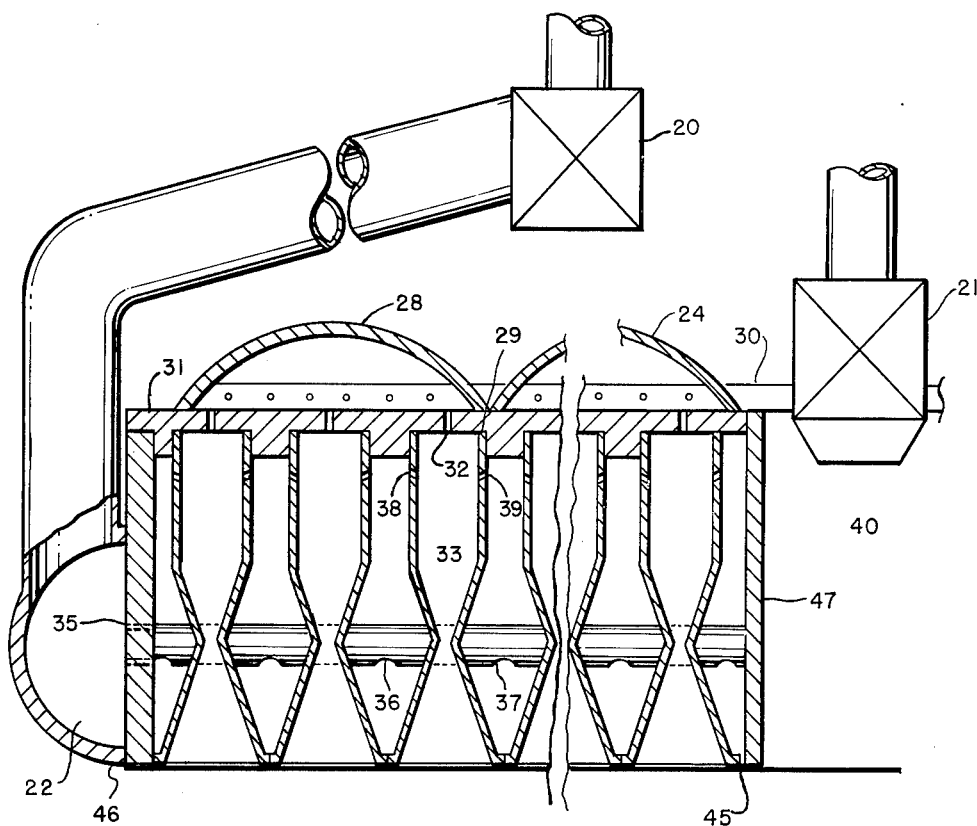
FIGURE 2 is a partially broken view taken along section line A—A in FIGURE 1.

In FIGURE 2, tubing 30 which is one of four radiating from valve 21 passes into and through each of the fuel manifolds 24 through 28 and contains a series of perforations as shown for filling each of these manifolds with pressurized fuel. This fuel is subsequently forced through the ports in the otherwise solid head plate 31 into the combustion chamber portions of the plurality of thrust chamber units, port 32 and combustion chamber 33 in unit 29 being typical examples. Of course tubing 30 is sealed at each point where it enters or exits from the manifolds and would be slightly offset so as not to block the ports for the thrust chambers directly therebelow.

Oxidizer liquid which has been introduced to manifold 22 under pressure from valve 20 is forced into conduit 35 which is one of a plurality of such conduits extending from manifold 22 either in a radially inward configuration or alternatively in a generally parallel arrangement. The number of conduits that is actually employed and the location and configuration of these conduits is determined in general by the efficiency and amount of cooling desired as well as the efficiency of oxidizer distribution. Conduit 35 passes through the space around the throats of the thrust chamber units and contains a series of downwardly directed outlets such as 36 and 37. Oxidizer forced out of the inlets would flow initially downward and thence upwards including a certain amount of flow along the exterior surfaces of the chamber units providing cooling therefor and finally into the combustion chamber portions through orifices such as 38 and 39. In the combustion chamber portions, mixing of the fuel and oxidizer will produce combustion and thrust.

Fuel valve 21 is shown in FIGURES 1 and 2 as being mounted in an open well 40 but there is nothing critical about how this valve is in fact mounted. The arrangement as shown reduces the adverse effects of heat transfer into the valve from head plate 31 while maintaining the entire engine structure as flat as possible. It should be understood that thrust chamber units could be mounted completely to the center of head plate 31 with valve 21 being somewhat raised and the interconnecting tubing being appropriately rearranged.

A cover plate 45 is brazed across the exit portion of the nozzles of the thrust chamber units to retain the oxidizer leaving the outlets in conduit 35. Cover plate 45 also provides a second advantage since the plurality of thrust chamber units will be held between cover plate 45 and head plate 31 in a manner quite analogous to the well known honeycomb structure. Thus the engine will have excellent mechanical strength.

To appreciate the simplicity with which the thrust producing device of the present invention can be fabricated consider the steps that are required in manufacturing an engine in accordance with FIGURES 1 and 2. First a large number of casings are manufactured in the general shape of a thrust chamber but with both ends open and with a preselected number of orifices through the side thereof. A typical such casing is shown at 29 and can be seen even more graphically in FIGURE 3. These casings can be easily produced en masse with presently available techniques and form the basic thrust chamber unit for the engine.

Next head plate 31 can be laid out from solid stock with the number of recesses and ports being machined thereinto as required by the number of thrust chamber units chosen. The combustion chamber portions can be inserted into the recesses as shown in FIGURE 2 and brazed in place. Then the conduits such as 35 can be inserted and welded to side skirt 46 which would be in turn brazed to head plate 31. Well skirt 47 can also be brazed to head plate 31 although it should be appreciated that head plate 31, well skirt 47 and side skirt 46 could be fabricated from a single piece of stock.

Cover plate 45 can be made with a series of holes therein each located so as to generally coincide with a respective nozzle exit but with a diameter substantially smaller than the nozzle exit. Thus cover plate 45 can be brazed to the nozzles as well as to skirts 46 and 47 and thereafter the holes can be machined out to conform to the nozzle exits. After attaching the fuel tubing and fuel manifolds to head plate 31 and the oxidizer manifold with its appropriate interconnections to the side skirt, the engine is complete and ready for coupling to the valve system. The entire fabrication has been performed by means of well known manufacturing techniques and with relatively loose tolerances.

To obtain a grasp of the reliability of operation that is inherent in the present invention, consider what would happen if leaks occur at the various brazing and welding points. For instance, leaks around the edges of fuel manifolds 24–28 could not mix with the oxidizer since head plate 31 is solid except for the ports communicating with the combustion chambers. Leaks of oxidizer around the upper portions of the chamber casings in the recesses in the head plates will simply result in additional mixing of the combustion materials. Finally leaks around nozzle exits will at most result in slight losses of oxidizer but may even provide somewhat of an after-burner effect. In any event, the worst that could happen from any of these leaks would be the loss of some propellant and certainly not destructive loss of the engine. Furthermore, it should be noted that the failure of even a few of the thrust chambers to produce any thrust at all can be expected to have a negligible effect upon the total mission in view of the inherent redundancy of the multitude of thrust chambers.

Figure 3:
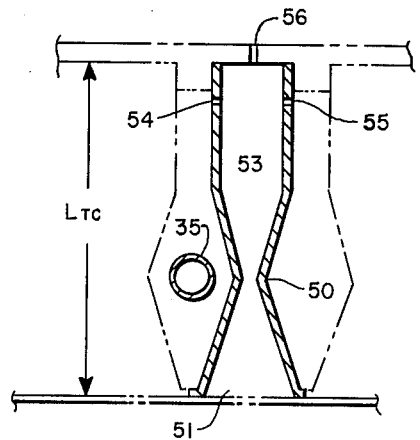
FIGURE 3 is a detail section view of a typical thrust chamber unit.

FIGURE 3 illustrates a typical casing for a thrust chamber unit which could well be adopted for a standard. The propellants to be employed are nitrogen tetroxide ($N_2O_4$) and aerozine with an oxidizer to fuel mixture ratio of 2:1, operating at a chamber pressure of 800 p.s.i.a. The throat 50 would have a diameter of 0.102 inch, the nozzle exit 51 a diameter of 0.712 inch, the combustion chamber 53 a diameter of about 0.500 inch and the nozzle length from throat to exit would be 0.9 inch. Oxidizer orifices 54 and 55 would be 0.0185 inch in diameter and the fuel orifice 56 would be 0.021 inch in diameter. This thrust chamber unit would produce 10 pounds of thrust and would have a total overall length, $L_{TC}$, of only 2.5 inches. Thus it can be seen that FIGURE 3 is almost a full scale drawing of a typical unit. Furthermore, design of rocket engines using this chamber as a standard is reduced almost to a matter of a simple arithmetic and geometry problem while the total engine length is held close to 2½ inches.

To further illustrate the simplicity of design, consider the thrust chamber arrangement shown in FIGURE 1 wherein these are 15 rings of chambers, three rings to each manifold 24 to 28. Allowing for the oxidizer manifold and fuel pump well, a total of 842 thrust units can be employed producing a total of 8420 pounds of thrust within a diameter of only 24 inches and with an engine height of a mere 3.5 inches including fuel manifolds. Furthermore a 25,000 pound thrust engine in accordance with this invention could be arranged within a 48 inch diameter yet still maintaining the same engine height. By the radically small engine height advantage, vehicle handling problems are eased and handling equipment can be more simple and less costly. Further, larger missiles can be placed in existing missile silos and future silos can be made smaller. The aforementioned figures were based upon thrust chamber units with an area ratio (exist to throat) of 50:1.

Another advantage of an engine built in accordance with the present invention is the marked reduction in flame length. For instance, a conventional 50,000 pound thrust engine would produce a flame length of 70 feet while an engine using the standard chamber suggested by FIGURE 3 would have a flame length of one foot or less. This means that simplified, low-cost flame deflectors can be used.

It should be noted that FIGURE 3 can be considered as being a section view taken along a plane generally perpendicular to the section plane of FIGURE 2. By this illustration, the orientation of conduit 35 relative to the thrust chamber units can be more clearly seen.

Figure 4:
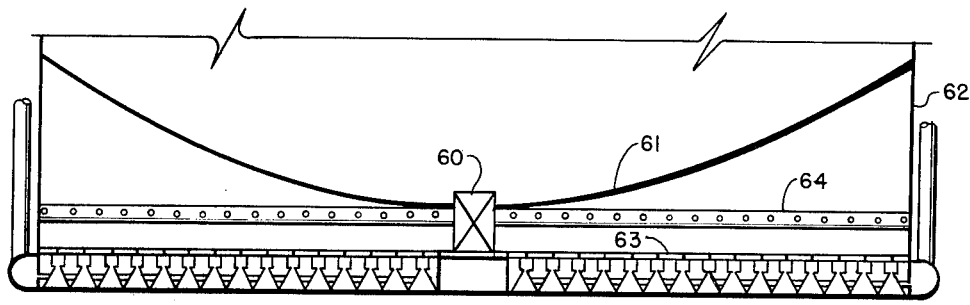
FIGURE 4 is a sectioned view of another embodiment in accordance with the present invention.

FIGURE 4 shows an alternative embodiment of the present invention wherein the oxidizer manifold and distribution system is substantially the same as in FIGURE 1 and 2. However, in FIGURE 4, the fuel valve is actually mounted so as to extend into both the bottom of the pressurized fuel storage tank and the fuel manifold area which is defined by tank bottom 61, skirt 62 and head plate 63. Distribution pipes such as 64 extend radially outward from valve 60 and contain ports therein programmed to ensure even propellant distribution. The tank bottom 61 and head plate 63 would be appropriately designed and inter-braced to obtain thrust transfer, of course, but the structure could be manufactured even more simply than the embodiment of FIGURES 1 and 2 with an even flatter overall configuration resulting. Operation of the engine per se, however, is the same as FIGURES 1 and 2.

Figure 5:
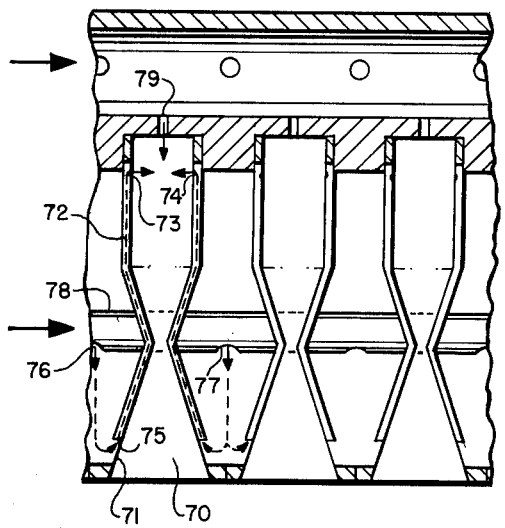
FIGURE 5 is a sectioned view of alternative thrust chamber units wherein special regenerative cooling channels are included.

FIGURE 5 shows a series of combustion chamber units each of which includes means for increasing the efficiency of the regenerative cooling of the oxidizer liquid. Thrust chamber unit 70, for example, is made up of an inner wall 71 and a shroud 72. Shroud 72 could be simply a cover or could be made up of a series of channels or tubes defining a hollow portion open at one end only by orifices 73 and 74 and at the other end at inlet slot 75. Thus oxidizer ejected from outlets 76 and 77 in conduit 78 must pass in intimate contact with the exterior of wall 71 before being injected through orifices 73 and 74 into the combustion chamber for mixing with fuel from port 79. The arrows in FIGURE 5 indicate the aforementioned propellant flows. It should be readily recognized that the chamber units of FIGURE 5 can be incorporated in any embodiment of the present invention.

Figure 6:
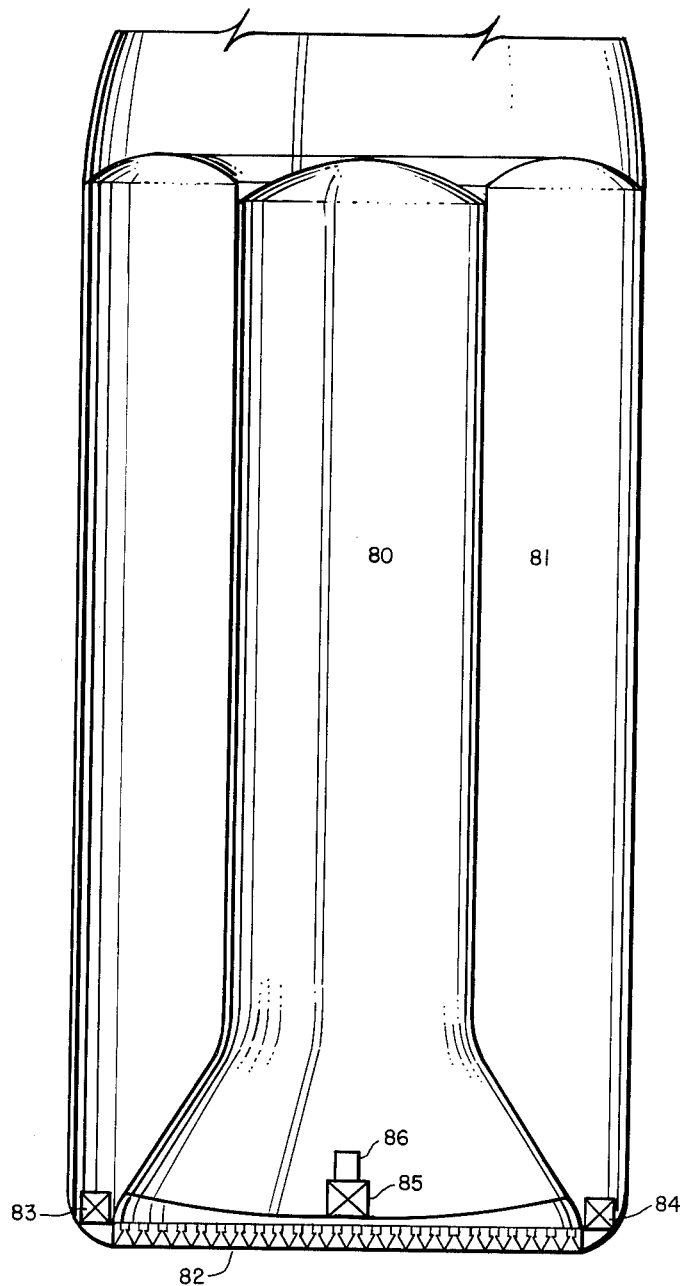
FIGURE 6 is a general view of the lower portion of a missile showing a possible concentric storage tank arrangement that can be advantageously employed with the present invention.

FIGURE 6 illustrates a stage of a missile wherein fuel storage tank 80 and oxidizer storage tank 81 are concentrically constructed. The fuel valving and manifold arrangement for engine 82 as well as the oxidizer manifold and distribution system are substantially the same as FIGURE 4. In addition, oxidizer valves 83 and 84 are physically located in the bottom of oxidizer tank 81. By this arrangement, maximum utilization of propellant storage space is accomplished with a substantial reduction in plumbing complexity.

A simple non-electrical ignition system is also illustrated in FIGURE 6 which makes it possible to use non-hypergolic propellant liquids. To be more specific, valve 85 is initially fed from a small quantity of liquid from slug 86 which liquid is hypergolic with the oxidizer from tank 81. Thus combustion is initiated in engine 82 and can be maintained by rapid switch-over to the fuel from tank 80 in place of the slug liquid. Electrical ignition can be included in the present invention, of course, if the additional complexity is acceptable.

Figure 7:
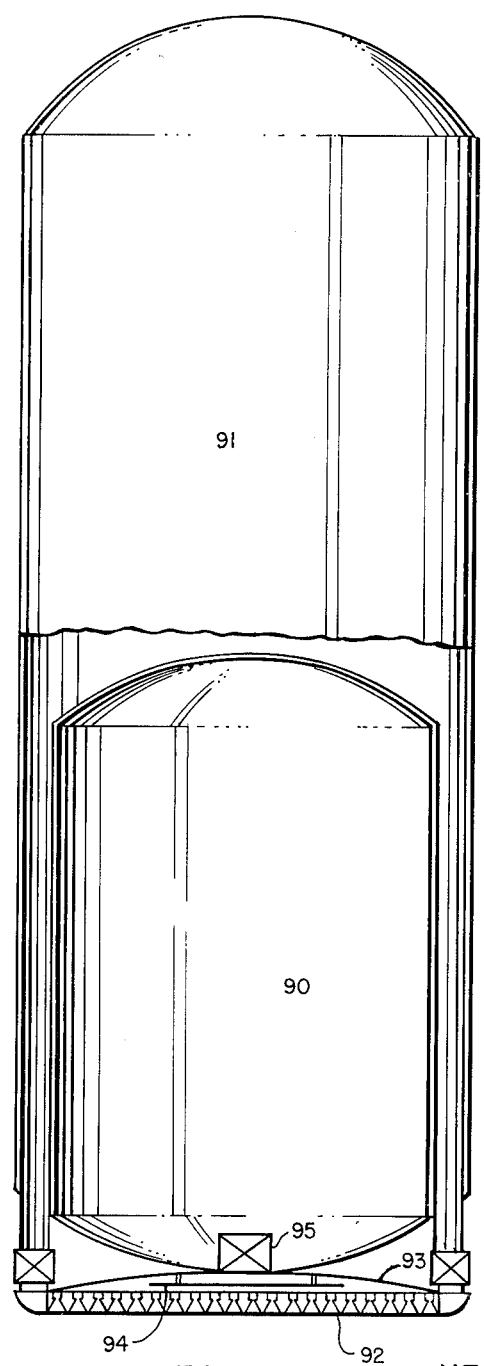
FIGURE 7 is a general view of a possible in-line storage tank arrangement.

FIGURE 7 shows a missile stage wherein the fuel tank 90 and oxidizer tank 91 are in-line, the oxidizer being introduced to engine 92 by appropriate plumbing. In addition, the engine 92 has a unitary dome-like fuel manifold 93 in which is mounted a splash plate 94 so that fuel valve 95 can dump the fuel into the manifold area with combustion flow being thereafter maintained by the tank pressure.

Figure 8:
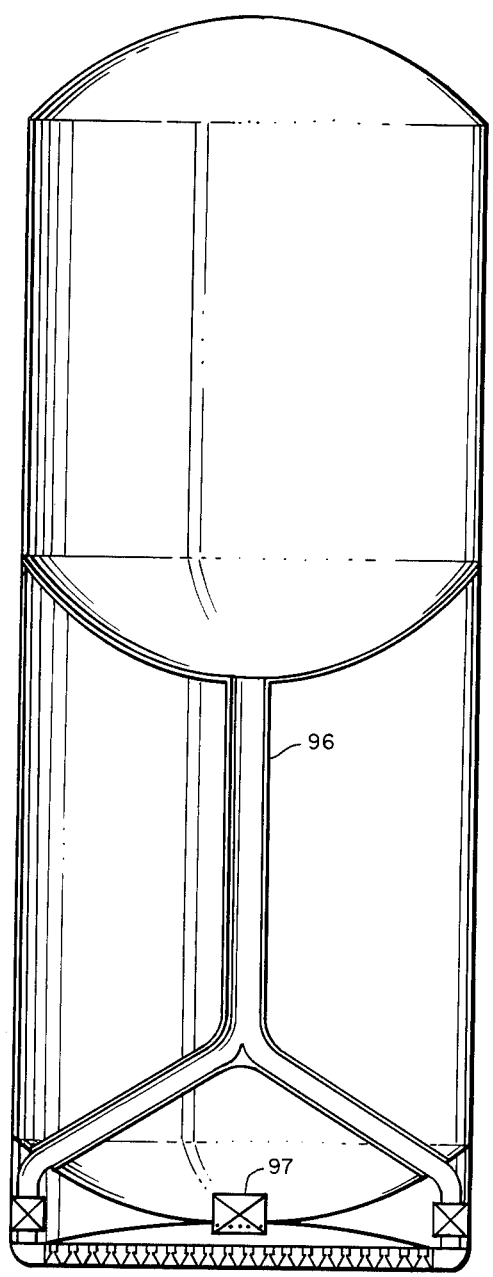
FIGURE 8 is another in-line storage tank arrangement possible in conjunction with the present invention.

FIGURE 8 is another possible arrangement of in-line storage tanks wherein the central column 96 and valve 97 arrangements permit the use of domes for the tank bottoms while allowing complete drainage of both tanks.

Figure 9:
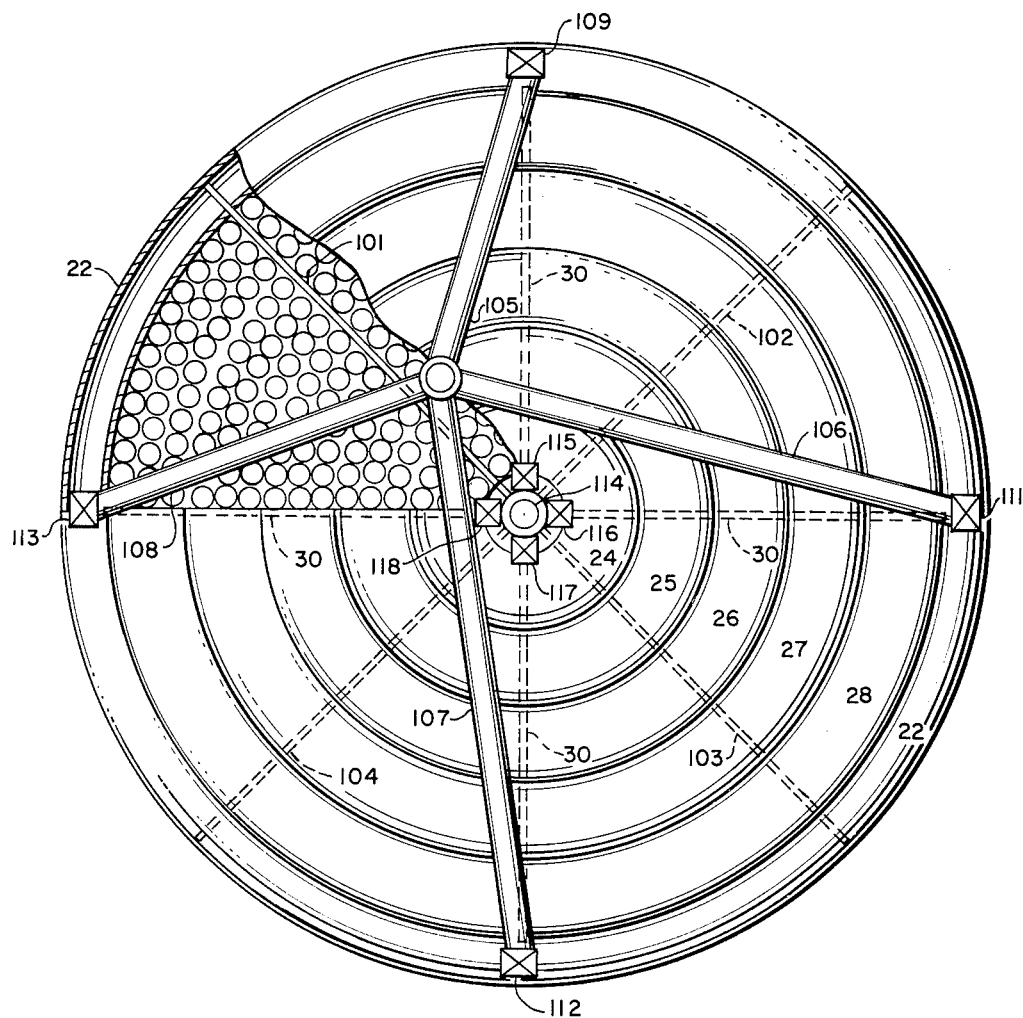
FIGURE 9 is a top view of a further alternative thrust chamber unit, similar to the embodiment of FIGURE 1, but showing a baffling arrangement, a portion of the upper manifold being broken away for clarity of illustration.

FIGURE 9 is an embodiment similar to FIGURE 1, but the thrust chamber unit is provided with baffle plates 101, 102, 103 and 104 which divides the thrust chambers, as well as manifolds 24–28 and manifold 22 into quadrants. Each quadrant of manifold 22 is supplied with oxidizer through pipes 105, 106, 107 and 108, respectively from an oxidizer storage tank. The amount of fuel supplied to each quadrant is controlled by valves 109, 111, 112 and 113 respectively. Similarly, pressurized fluid fuel is supplied through pipe 114, to valves 115, 116, 117 and 118. Each of these valves supply the respective tubing 30, as shown, for supplying fuel to the respective quadrant sections of manifolds 24–28. Thus, fuel may be supplied through one valve, such as valve 115, and oxidizer supplied through one valve, such as valve 109, to restart the thrust chambers of this quadrant to provide thrust vectoring of the space vehicle, such as for rendezvousing to space vehicles in orbit. Of course, when fuel is supplied to one quadrant, the other quadrants may be shut off entirely or the fuel supplied to one of the quadrants may be greater than that supplied to the other quadrants. Thus, the necessity for a gimbaled engine is eliminated. It will be understood that the engine may be divided into a larger number of quadrants, if desired, but that for most purposes four quadrants are satisfactory.

There are many variations of structure and utility within the spirit of the present invention. Although the embodiments shown and described herein reveal circular configurations, it should be appreciated that the engine of this invention can be readily adapted to any desired configuration. For instance a rectangular array could be constructed which could have considerable utility for aircraft or the so-called astroplane application. Further, the nozzle area ratios (exit area to throat area) could be programmed or stepped to increase overall operating efficiency especially where the mission will encounter varied atmospheric conditions.

Although the thrust producing device of the present invention has been described hereinbefore with particularity, the invention is not intended to be limited thereto. In fact, many variations within the spirit of this invention will be readily apparent to those having normal skill in the art once the present invention becomes known.

The thrust chamber units can be fabricated from porous material. Sintering, weaving or any technique for making porous material can be utilized. By this means, the thrust chamber wall cooling can be accomplished by transpiring the coolant liquid entirely or in part through the wall into the chamber. This is known as "sweat cooling." In general, all types of cooling techniques known in rocket technology can be employed, including uncooled arrangements.

What I claim is:

1. A substantially flat thrust producing device comprising:
   (a) a plurality of elongated thrust chamber units each
      (i) being open at both ends and having along the length thereof a combustion chamber portion, a reduced throat portion and an exhaust nozzle, and
      (ii) having at least one orifice through the side thereof communicative with the said combustion chamber portion,
   (b) a head plate
      (i) having said plurality of chamber units perpendicularly mounted on one side thereof at the said combustion chamber portion ends thereof and
      (ii) including a plurality of ports therethrough each communicative with respective said combustion chamber portions,
   (c) first manifold means for selectably introducing a first propellant liquid under pressure into said combustion chamber portions through said ports,
   (d) a cover plate
      (i) sealably attached to said exhaust nozzles and
      (ii) including a plurality of holes therethrough each coincident with respective said exhaust nozzles for permitting escape of exhaust gases,
   (e) means for sealing together the edges of said head plate and said cover plate,
   (f) a plurality of conduits arranged through the spaces between said thrust chamber units and each
      (i) containing a series of outlets therealong directed towards said cover plate and
      (ii) passing through said sealing means, and
   (g) a second manifold means for selectably introducing a second propellant liquid under pressure into said conduits,
   (h) whereby said second propellant liquid will provide cooling for the device by being circulated around said chamber units and thrust will be produced by combustion of said propellants in said combustion chamber portions.

2. A thrust producing device in accordance with claim 1 wherein
   (a) said thrust chamber units are arranged in concentric bands between said head plate and said cover plate, and
   (b) said first manifold means
      (i) includes a plurality of concentric manifold ring covers each attached to said head plate over a respective said concentric band of said thrust chamber units, and
      (ii) which further includes a plurality of tubes sealably extending into said covers and containing perforations therein for introducing said first propellant liquid into said covers.

3. A thrust producing device in accordance with claim 1 which includes
   (a) a tank for storing said first propellant liquid under pressure,
   (b) a side skirt sealably attaching the bottom of said tank and said head plate,
   (c) said first manifold means including the space defined by
      (i) the bottom of said tank,
      (ii) said side skirt, and
      (iii) said head plate,
   (d) said device further including valving means for selectably introducing said first propellant liquid from said tank into the space in said first manifold means.

4. A thrust producing device in accordance with claim 1 wherein each said thrust chamber unit includes a shroud therearound
   (a) sealably attached to the combustion chamber end thereof and
   (b) externally encasing said chamber unit including the said orifice thereof so as to define a space between said shroud and said chamber unit,
   (c) said shroud being open at the exhaust nozzle end for permitting entry of said second propellant liquid therein so that flow thereof will be restricted to intimate contact with the surface of said chamber unit from the exhaust nozzle end into said orifice.

5. A thrust producing device in accordance with claim 1 which includes
   (a) a plurality of baffle means for isolating said first and second manifold means and said thrust chamber units into segments, and
   (b) a plurality of sets of flow control devices each connected and arranged for selectably controlling the amount of said propellant liquids being introduced to respective said segments,
   (c) whereby the direction of the effective thrust vector of said thrust producing device can be selectably varied.

6. A substantially flat thrust producing device comprising:
   (a) a plurality of elongated thrust chamber units, each having along the length thereof
      (i) a combustion chamber portion and
      (ii) an exhaust nozzle,
   (b) a head plate
      (i) having said plurality of chamber units perpendicularly mounted on one side thereof at the said combustion chamber portion ends thereof and
      (ii) including a plurality of ports therethrough, each communicative with respective said combustion chamber portions,
   (c) first manifold means for selectably introducing a first propellant liquid under pressure into said combustion chamber portions through said ports,
   (d) a cover plate
      (i) sealably attached to said exhaust nozzles and
      (ii) including a plurality of holes therethrough, each coincident with respective said exhaust nozzles for permitting escape of exhaust gases,
   (e) means for sealing together the edges of said head plate and said cover plate,
   (f) a plurality of conduits arranged through the spaces between said thrust chamber units, and each
      (i) passing through said thrust producing devices and
      (ii) containing a series of outlets therealong,
   (g) a second manifold means for selectably introducing a second propellant liquid under pressure into said conduits,
   (h) whereby thrust will be produced by combustion of said propellants in said combustion chamber portions.

References Cited by the Examiner

UNITED STATES PATENTS

| 3,102,388 | 9/1963 | Abild | 60—35.6 |
| 3,112,611 | 12/1963 | Adamson | 60—35.6 |

FOREIGN PATENTS

| 862,148 | 3/1961 | Great Britain. |

OTHER REFERENCES

Davis G. H.: "From Europe to New York by Rocket?" Popular Mechanics, March 1932, pages 458–464.

SAMUEL LEVINE, *Primary Examiner.*